United States Patent
Auch

(10) Patent No.: US 9,598,054 B2
(45) Date of Patent: Mar. 21, 2017

(54) WIPER LEVER OF A MOTOR VEHICLE WINDSHIELD WIPER

(71) Applicant: Dr. Ing. h.c. F. Porsche Aktiengesellschaft, Stuttgart (DE)

(72) Inventor: Sven Auch, Stuttgart (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/653,052

(22) PCT Filed: Dec. 11, 2013

(86) PCT No.: PCT/EP2013/003743
§ 371 (c)(1),
(2) Date: Jun. 17, 2015

(87) PCT Pub. No.: WO2014/095006
PCT Pub. Date: Jun. 26, 2014

(65) Prior Publication Data
US 2016/0193985 A1      Jul. 7, 2016

(30) Foreign Application Priority Data
Dec. 18, 2012   (DE) .................. 10 2012 112 526

(51) Int. Cl.
*B60S 1/34*     (2006.01)
*B60S 1/40*     (2006.01)

(52) U.S. Cl.
CPC .............. *B60S 1/40* (2013.01); *B60S 1/3427* (2013.01); *B60S 1/3479* (2013.01);
(Continued)

(58) Field of Classification Search
CPC .... B60S 1/3445; B60S 1/3425; B60S 1/3463; B60S 1/3429; B60S 1/3479; B60S 1/3475;
(Continued)

(56) References Cited

U.S. PATENT DOCUMENTS 2,156,505 A    5/1939  Marcolivio
3,014,232 A   12/1961  Krohm
(Continued)

FOREIGN PATENT DOCUMENTS

DE    198 29 759    1/2000
DE    102 59 479    7/2004
(Continued)

OTHER PUBLICATIONS

International Search Report of Jul. 7, 2014.
English Translation of the Written Opinion of the International Searching Authority.

*Primary Examiner* — Gary Graham
(74) *Attorney, Agent, or Firm* — Gerald E. Hespos; Michael J. Porco; Matthew T. Hespos

(57) ABSTRACT

The invention relates to a wiper lever of a motor vehicle windshield wiper, especially a rear window wiper, comprising a windshield wiper arm, a wiper blade and a cover. According to the invention, the wiper arm is designed as a spring strip on which a slider, which is connected to the wiper blade, is longitudinally adjustable. The cover is connected to the slider such and can be connected to a wiper pin such that an angle of lift of the wiper lever can be compensated. The invention provides a cost-effective wiper lever which has a structurally simple design.

7 Claims, 2 Drawing Sheets

(52) U.S. Cl.
CPC ............ *B60S 1/3481* (2013.01); *B60S 1/4083* (2013.01); *B60S 2001/409* (2013.01)

(58) Field of Classification Search
CPC ........ B60S 1/3481; B60S 1/3484; B60S 1/40; B60S 1/4083
USPC ...................................... 15/250.351, 250.352
See application file for complete search history.

(56) References Cited

U.S. PATENT DOCUMENTS

| | | | | |
|---|---|---|---|---|
| 3,480,985 | A | * 12/1969 | Forster | ...................... B60S 1/34 15/250.34 |
| 5,673,456 | A | 10/1997 | Berge et al. | |
| 6,499,179 | B1 | 12/2002 | Fink et al. | |
| 7,908,704 | B2 | * 3/2011 | Kraemer | ............... B60S 1/3452 15/250.351 |
| 2008/0052864 | A1 | 3/2008 | Weiler et al. | |
| 2010/0251502 | A1 | 10/2010 | Summerville et al. | |

FOREIGN PATENT DOCUMENTS

| | | | |
|---|---|---|---|
| DE | 10 2010 012 983 | | 2/2011 |
| EP | 0538093 | * | 4/1993 |
| EP | 0 716 965 | | 6/1996 |
| EP | 0753439 A1 | * | 1/1997 |
| EP | 1 575 813 | | 9/2005 |
| FR | 2652325 | * | 3/1991 |

* cited by examiner

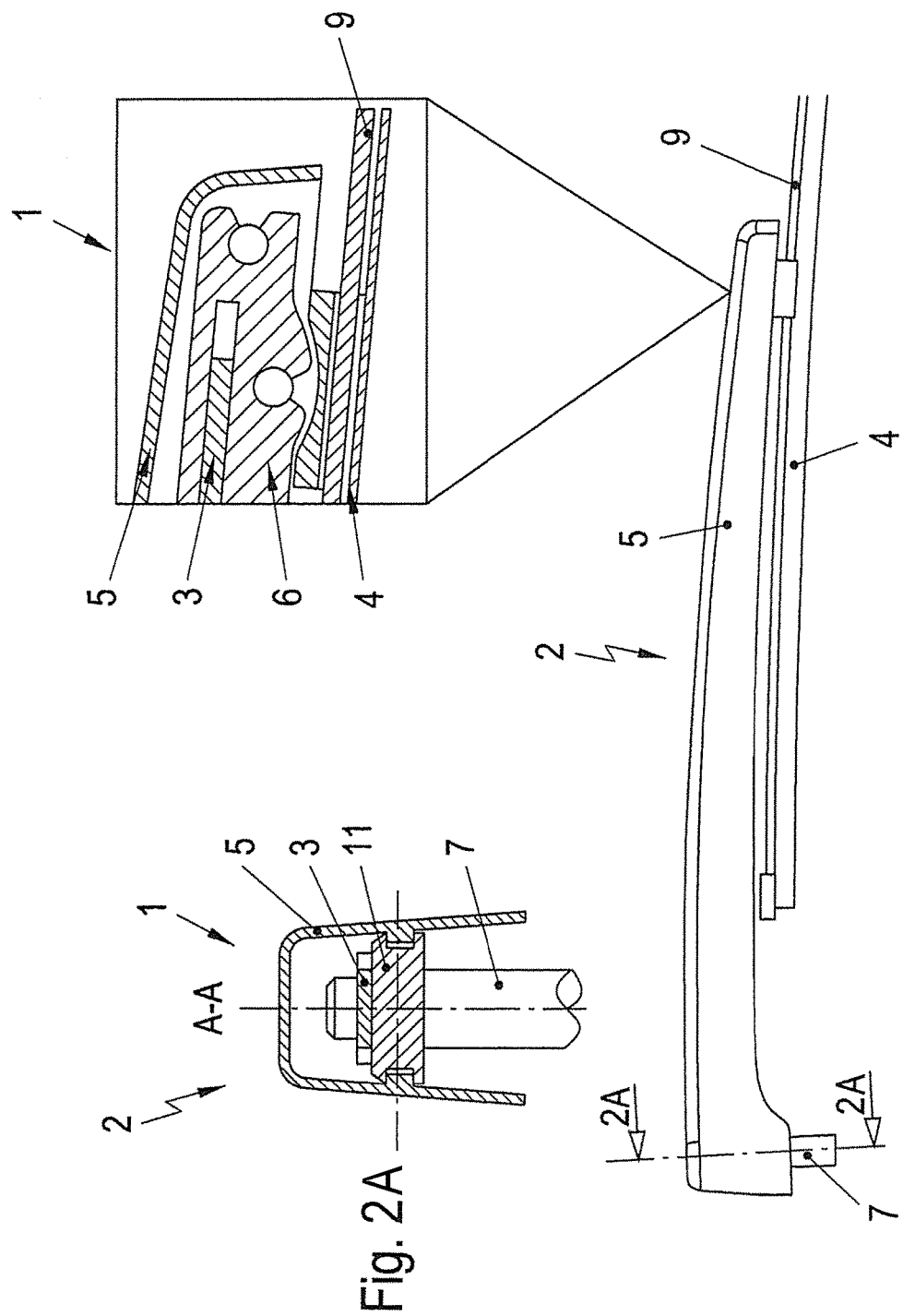

WIPER LEVER OF A MOTOR VEHICLE WINDSHIELD WIPER

BACKGROUND

1. Field of the Invention

The present invention relates to a wiper lever of a motor vehicle windshield wiper with a wiper arm, wiper blade and a covering according to the preamble of claim 1. The invention also relates to a windshield wiper with at least one wiper arm of this type and to a motor vehicle with such a windshield wiper.

2. Description of the Related Art

DE 10 2010 012 983 A1 discloses a wiper lever of the type in question with a wiper arm, a wiper blade and a covering. The wiper lever here comprises a hub and a pivot pin which connects the wiper arm to the hub. By means of a pair of contacts connected coaxially to the pivot pin, side walls of the wiper arm are spaced apart from the hub. The covering which is formed from one piece has a U-shaped cross section and provides a base wall which extends over the entire length of the wiper arm and of the wiper blade, and also side walls which are spaced apart transversely, extend downward from the base wall and conceal the wiper arm and the wiper blade equally from sight. A pair of snap-in tabs integrally formed on the covering reaches into an intermediate space between the wiper arm side walls and the hub in order to be attached to the pair of contacts via a snap connection such that the covering can be attached removably to the wiper lever. The intention is thereby to be able to provide a covering which both satisfies esthetic demands and is also easily removable.

EP 1 575 813 B1 discloses a wiper lever with a wiper arm and a wiper blade, which wiper arm is connected to the wiper blade in a joint-free manner. The wiper arm and the wiper blade here are at least partially integrally formed. It is intended here to be of particular importance for the wiper blade to be connected between the wiper blade ends thereof to the wiper arm via at least one spring-elastic cross piece with the wiper blade. The intention by this means is in particular to be able to obtain a simple and flat structure with comparatively few components.

The present invention is concerned with the problem of providing, for a wiper lever of the type in question, an improved embodiment which is distinguished in particular by a significantly simplified structure and furthermore manages without the previously required joint.

This problem is solved according to the invention by the subject matter of the independent claims. Advantageous embodiments are the subject matter of the dependent claims.

SUMMARY OF THE INVENTION

The present invention relates to a wiper lever of a windshield wiper that has a wiper arm, a wiper blade and a covering. The wider lever does not have a joint in the region of the wiper arm to enable removal of the wiper lever from the motor vehicle window, but rather designs the wiper arm as a spring rail which, owing to the elasticity thereof, firstly prestresses the wiper blade against the motor vehicle window and, secondly, is capable of compensating for an angle of lift of the wiper lever when the wiper lever is removed from the motor vehicle window, that is to say, of withstanding lifting off of the wiper arm. According to the invention, the wiper arm is designed as a spring rail on which a slider, which is connected to the wiper blade, is longitudinally adjustable. The covering in turn is connected to the slider and is connectable to a wiper spindle of a windshield wiper in such a manner that the angle of lift of the wiper lever during lifting from the motor vehicle window can be compensated for. This permits firstly an integral design of the wiper arm and secondly a likewise integral design of the covering. Thus, a joint previously provided in the region of the covering and/or of the wiper arm can be omitted. By omission of said joint, the entire wiper lever can be constructed not only with fewer components and therefore significantly more simply in terms of the structure, but can also be produced more cost-effectively. Owing to the spring rail, which customarily is formed from metal, and the cover, which customarily is formed from plastic, firstly a comparatively light wiper lever can be provided which secondly, however, has a comparatively high strength, which is of great advantage in particular in the event of higher snow loads or in a washing installation. The wiper lever according to the invention therefore has the strength of a wiper lever made from metal, but with the weight of a wiper lever made from plastic, or less. Furthermore, it is of particular advantage that, in the case of the wiper lever according to the invention, there no longer need be any concern about previously occurring color matching problems. In comparison to a wiper lever made from metal, the wiper lever according to the invention is also more cost-effective and lighter. The omission of the joint means that the corrosion problems occurring here to date can also be reliably avoided. However, the elasticity of the wiper arm provides the possibility of lifting the wiper blade from the motor vehicle window, for example a rear window, wherein the covering is capable here of displacing the wiper blade along the wiper arm via the slider and therefore of compensating in terms of length for the angle of lift arising when the wiper lever is lifted off the motor vehicle window.

The spring rail expediently is formed from metal and serves at the same time as a guide rail for the slider. The formation of the spring rail from metal affords the great advantage that the contact pressure force of the wiper blade that is required for clean wiping of the motor vehicle window can be provided over the long term and in particular without additional spring elements. Furthermore, the covering can be formed from plastic, as a result of which said covering can not only be produced comparatively cost effectively but also in virtually any colors. The covering here is preferably designed in such a manner that it conceals the wiper arm, in particular engages around same in a U-shaped manner. Of course, the covering here is designed to be of a length such that it not only conceals the wiper arm but, furthermore, also the wiper spindle which is connected to the wiper arm for rotation therewith and is connected to a drive, for example an electric motor, for rotation therewith. By means of a covering formed in such a manner, the entire wiper arm, the wiper spindle and at the same time also part of the wiper blade can be clad in a visually attractive manner.

The wiper blade may be connected to the slider in an articulated manner. Such an articulated connection of the wiper blade to the slider makes it possible to adapt the wiper blade position to, for example, curvatures of the motor vehicle window to be wiped, which curvatures change during the wiping movement. An articulated connection of this type is already provided nowadays between the respective wiper blade and the wiper arm. Of course, the wiper blade itself can still be arranged on a resilient wiper bracket which forces or at least assists a linear contact of the wiper blade against the motor vehicle window to be wiped.

A fastening part expediently is provided via which the wiper arm is connected to the wiper spindle for rotation therewith. The fastening part here can be designed in the manner of a hub which can be connected to the wiper spindle, for example by means of a form-fitting connection, for rotation therewith. The fastening part here can be formed separately from the wiper arm or else integrally therewith. Particularly the last embodiment affords the advantage of reducing the number of individual components, which leads to a reduction in the costs of storage and logistics and to a reduction in the installation complexity.

Further important features and advantages of the invention emerge from the dependent claims, from the drawings and from the associated description of the figures with reference to the drawings.

It goes without saying that the features which are mentioned above and those which have yet to be explained below can be used not only in the respectively stated combination but also in different combinations or on their own without departing from the scope of the present invention.

Preferred exemplary embodiments of the invention are illustrated in the drawings and are explained in more detail in the description below, wherein identical reference signs refer to identical or similar or functionally identical components.

BRIEF DESCRIPTION OF THE DRAWINGS

FIG. 2 shows the wiper lever in a view and various sectional illustrations.

FIG. 2A shows a cross section taken at 2A-2A in FIG. 2.

DETAILED DESCRIPTION

Figure 1:
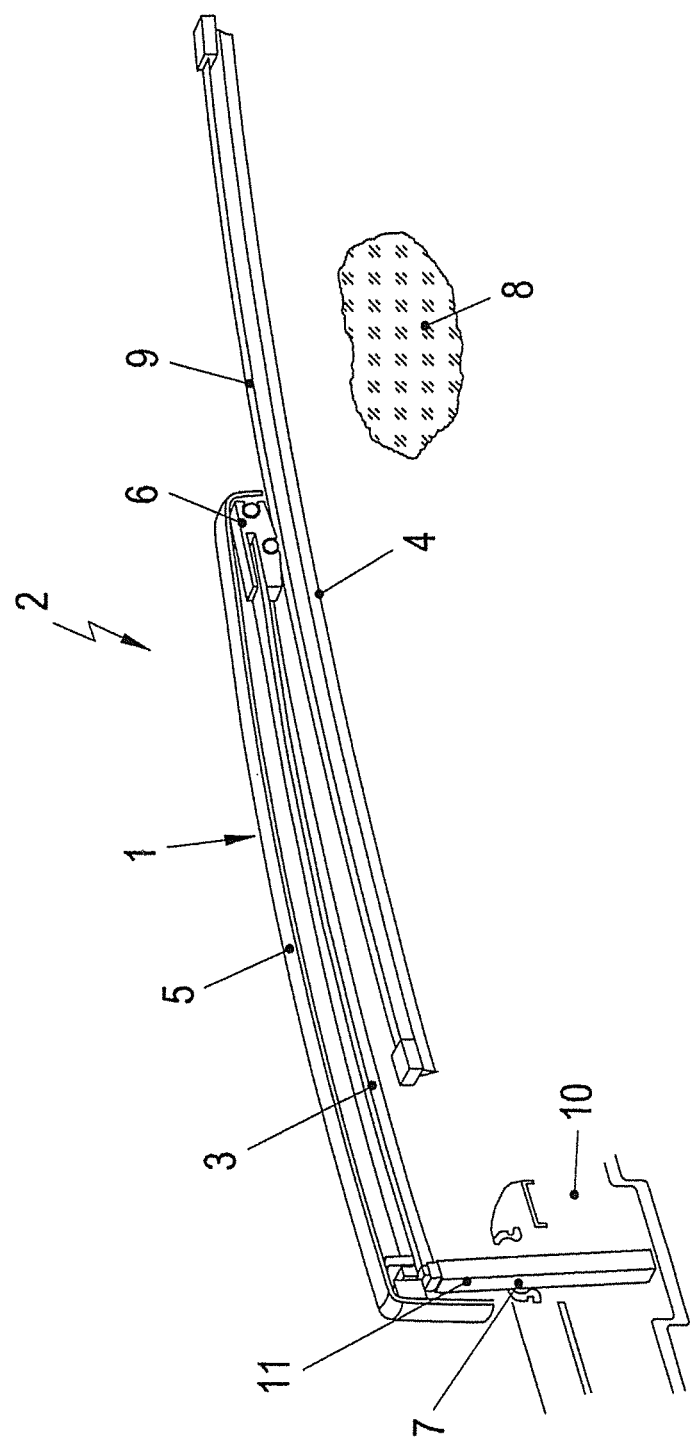
FIG. 1 shows a wiper lever according to the invention of a windshield wiper.

According to FIGS. 1 and 2, a wiper lever 1 according to the invention of a windshield wiper 2, in particular of a rear window wiper of a motor vehicle (otherwise not illustrated), has a wiper arm 3, a wiper blade 4 and a covering 5. According to the invention, the wiper arm 3 is designed as a spring rail on which a slider 6, which is connected to the wiper blade 4, is longitudinally adjustable. The covering 5 is connected here to the slider 6 and is connectable or is connected to a wiper spindle 7 in such a manner that an angle of lift of the wiper lever 1 can be compensated for. With the wiper lever 1 according to the invention, the provision of a previously required joint for lifting said wiper lever from a motor vehicle window 8 is therefore no longer required. By means of the omission of a joint of this type, not only can a corrosion problem in the region of the joint be avoided, but the wiper lever 1 can also be constructed significantly more simply in terms of structure.

The wiper arm 3 designed as a spring rail is customarily formed here from metal and serves at the same time as a guide rail for the slider 6. The metallic formation of the spring rail means that the latter firstly brings about the contact pressure force, which is required for an optimum wiping operation, of the wiper blade 4 against the motor vehicle window 6, but, secondly, also permits easy lifting of the wiper lever 1 from the motor vehicle window 8. The covering 5 is preferably formed from plastic and, as a result, can not only be produced cost-effectively but also in virtually any colors. The covering 5 conceals the wiper arm 3 and at least part of the wiper blade 4 and the wiper spindle 7, thus making it possible to obtain an extremely esthetic impression.

In the right upper sectional illustration of FIG. 2, it is seen that the wiper arm 3 is mounted so as to be displaceable in a sliding manner in the slider 6 along the longitudinal axis of the wiper arm 3 (spring rail) and thereby permits the length compensation required by the lifting. Furthermore, the wiper blade 4 is connected to the slider 6 in an articulated manner and is thereby capable of compensating for changes in curvature of the motor vehicle window 8 that possibly occur during the wiping movement. Of course a wiper bracket 9, on which the wiper blade 4 is arranged, can also be formed in the same manner.

The windshield wiper 2 furthermore has a drive 10, for example in the manner of an electric motor, which drives the wiper spindle 7. The wiper arm 3 of the wiper lever 1 is connected here to the driven wiper spindle 7 for rotation therewith, wherein, for example, a fastening part 11 can be provided for the connection providing conjoint rotation. The fastening part 11 can be formed here separately from the wiper arm 3 or integrally therewith, wherein, in the last case, the number of parts can be reduced and therefore the costs of storage and logistics and the installation complexity can be reduced.

The covering 5 is preferably formed integrally, in particular even in a U-shaped manner, and additionally customarily also covers the wiper spindle 7 in addition to the wiper arm 3.

When the wiper lever 1 is lifted from the motor vehicle window 8, for example a rear window, the elastic wiper arm 3, which is designed as a spring rail, is bent elastically, wherein, by means of a coupling of the covering 5 to the slider 6, the latter is simultaneously displaced along the wiper arm 3 in the direction of the wiper spindle 7 in order to compensate for an angle of lift.

With the wiper lever 1 according to the invention, it is possible in particular to reduce the weight and therefore the diversity of parts, wherein, nevertheless, a strength which is increased in comparison to a wiper lever formed from plastic can be achieved, which is of advantage in particular in the event of a snow load and in washing installations. The previously occurring color matching and graying problems can likewise be avoided since now there is only one single component formed from plastic, namely the covering 5. Particularly the omission of the previously required joint makes the wiper lever 1 according to the invention structurally extremely simple.

The invention claimed is:

1. A wiper lever of a windshield wiper, comprising a wiper arm defining a resiliently flexible metal spring rail having opposite first and second ends, the first end of the wiper arm being connectable to a wiper spindle, a slider longitudinally adjustably mounted at the second end of the wiper arm, a wiper blade mounted on the slider in an articulated manner, and an integrally formed plastic covering having opposite first and second ends, the second end of the covering being movably connected to and covering the slider and the first end of the covering being connectable to and covering the wiper spindle, the plastic covering defining a U-shaped cross-section between the first and second ends for covering the wiper arm, the slider and the spindle, whereby the resiliently flexible spring rail and the longitudinally adjustable mounting of the slider on the wiper arm enable an angle of lift of the wiper arm without a pivotable connection to the wiper spindle.

2. A windshield wiper for a window of a motor vehicle, comprising: a wiper lever with a resiliently flexible metal wiper arm having opposite first and second ends, the first end of the wiper arm being connected to a driven wiper spindle for rotation therewith; a slider longitudinally adjustably mounted at the second end of the wiper arm; a wiper blade pivotally mounted on the slider; and an integrally formed plastic covering having opposite first and second ends, the first end of the covering being connectable to and covering the wiper spindle and the second end of the covering being movably connected to and covering the slider, the plastic covering defining a U-shaped cross-section between the first and second ends for covering the wiper arm, the slider and the spindle, whereby the resiliently flexible wiper arm and the longitudinally adjustable mounting of the slider on the wiper arm enable the wiper blade to be lifted from the window without a pivotable connection of the wiper arm to the wiper spindle.

3. The windshield wiper of claim 2, further comprising a fastening part via which the wiper arm is connected to the wiper spindle for rotation therewith.

4. The windshield wiper of claim 3, wherein the fastening part is formed separately from the wiper arm.

5. The windshield wiper of claim 3, wherein the fastening part is formed integrally with the wiper arm.

6. The windshield wiper of claim 2, wherein the wiper arm is fixedly connected to the wiper spindle by a connection without a pivot joint, and wherein the wiper arm is resiliently deflectable at locations spaced from the wiper spindle for displacement toward and away from the window.

7. A motor vehicle with the windshield wiper of claim 2.

\* \* \* \* \*